United States Patent Office 2,908,717
Patented Oct. 13, 1959

2,908,717

BIS(3-HALO-2-CHLOROPROPENYL) SULFIDE

Howard Johnston, Concord, Calif., assignor to The Dow Chemical Company, Midland, Mich., a corporation of Delaware No Drawing. Application August 4, 1958
Serial No. 753,102

4 Claims. (Cl. 260—609)

The present invention is directed to Bis(3-halo-2-chloropropenyl) sulfide corresponding to the formula

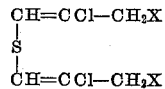

wherein X represents bromine or chlorine. These novel compounds are crystalline solids or viscous liquids which are somewhat soluble in many organic solvents. They have been found to be useful as parasiticides and are adapted to be employed as active toxic constituents of compositions for the control of many insects, bacterial and fungal organisms such as *Fusarium solani, Rhizoctonia solani* and mites The new compounds may be prepared by mixing and blending sulfur dichloride with propynyl chloride or propynyl bromide. The mixing and blending may be carried out in an inert organic solvent as reaction medium. The amounts of the reactants to be employed are not critical, some of the desired product being obtained when any proportion of ingredients is employed. Good results are obtained when one molecular proportion of sulfur dichloride is reacted with at least two molecular proportions of the propynyl halide. The reaction is somewhat exothermic and takes place smoothly at temperatures of from 15° to 50° C. The temperature may be controlled by regulating the rate of combining the reactants and by external cooling.

In carrying out the reaction, the sulfur dichloride is slowly added portionwise to the propynyl halide and solvent, if employed. The addition is carried out with stirring and at a temperature of from 15° to 50° C. Upon completion of the reaction, the reaction mixture may be concentrated by fractional distillation under reduced pressure at gradually increasing temperatures up to a temperature of 50° C. to obtain the desired product as a residue. The product may be further purified by conventional methods.

The following examples illustrate the invention and are not to be construed as limiting.

EXAMPLE 1

*Bis(3-bromo-2-chloropropenyl) sulfide*

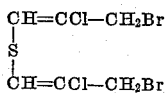

Sulfur dichloride (20.6 grams; 0.2 mole) was added dropwise with stirring and cooling to 47.5 grams (0.4 mole) of propynyl bromide. The addition was carried out over a period of 25 minutes and at a temperature of about 25° C. Following the addition, the reaction mixture was placed under a pressure of 3 millimeters and distilled for 30 minutes at a temperature of 35° C. to obtain a bis(3-bromo-2-chloropropenyl) sulfide product as a crystalline residue. This product melted at 30° C. and had bromine, chlorine and sulfur contents of 46.9 percent, 20.9 percent and 9.26 percent as compared with theoretical contents of 46.8, 20.8 and 9.4 percent, respectively.

EXAMPLE 2

*Bis(2,3-dichloropropenyl) sulfide*

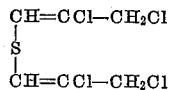

In a similar manner, one molecular proportion of sulfur dichloride was added dropwise with stirring and cooling to two molecular proportions of propynyl chloride. The addition was carried out over a period of 30 minutes and at a temperature of about 25° C. Following the addition, the reaction mixture was concentrated by distillation under reduced pressure at a temperature of about 50° C. to obtain a bis(2,3-dichloropropenyl) sulfide product as a viscous liquid. This product contained 56.1 percent chlorine, as compared to a theoretical content of 56 percent.

The new compounds have been tested and found to be useful as parasiticides. For such use, the products may be dispersed on an inert, finely divided solid and employed as dusts. Also, such mixtures may be dispersed in water with the aid of a wetting agent and the resulting aqueous suspensions employed as sprays. In other procedures, the products may be employed as constituents in oil-in-water emulsions or water dispersions with or without the addition of wetting, dispersing and emulsifying agents. In representative operations, aqueous compositions containing 100 parts per million by weight of bis-(3-bromo-2-chloropropenyl) sulfide gave substantially complete controls of two spotted spider mites infecting stands of mature cranberry bean plants without appreciable injury to the plants.

I claim:

1. A bis(3-halo-2-chloropropenyl) sulfide corresponding to the formula

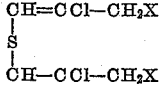

wherein X represents a member of the group consisting of bromine and chlorine.

2. Bis(3-bromo-2-chloropropenyl) sulfide.
3. Bis(2,3-dichloropropenyl) sulfide.
4. A method for the production of a bis(3-halo-2-chloropropenyl) sulfide corresponding to the formula

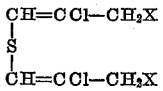

wherein X represents a member of the group consisting of bromine and chlorine which comprises reacting sulfur dichloride with a member of the group consisting of propynyl bromide and propynyl chloride.

No references cited.